US012497835B2

(12) United States Patent
Astor et al.

(10) Patent No.: US 12,497,835 B2
(45) Date of Patent: Dec. 16, 2025

(54) LADDER AND LADDER TOP WITH TOOL SLOT

(71) Applicant: Werner Co., Greenville, PA (US)

(72) Inventors: Kyle G. Astor, Saegertown, PA (US); Marc V. Marini, Elmhurst, IL (US)

(73) Assignee: Werner Co., Itasca, IL (US)

( * ) Notice: Subject to any disclaimer, the term of this patent is extended or adjusted under 35 U.S.C. 154(b) by 873 days.

(21) Appl. No.: 17/024,282

(22) Filed: Sep. 17, 2020

(65) Prior Publication Data

US 2021/0002960 A1 Jan. 7, 2021

Related U.S. Application Data

(63) Continuation of application No. 13/608,643, filed on Sep. 10, 2012, now Pat. No. 10,781,636, which is a continuation of application No. 12/322,647, filed on Feb. 5, 2009, now Pat. No. 8,272,478, which is a continuation of application No. 11/347,613, filed on Feb. 3, 2006, now Pat. No. 8,376,085.

(51) Int. Cl.
*E06C 7/14* (2006.01)

(52) U.S. Cl.
CPC .................................... *E06C 7/14* (2013.01)

(58) Field of Classification Search
CPC ... E06C 7/14; E06C 7/48; E06C 7/482; B25H 3/00; B25H 3/02; B25H 3/023; B25H 3/06
See application file for complete search history.

(56) References Cited

U.S. PATENT DOCUMENTS

| | | | |
|---|---|---|---|
| 529,871 | A | 11/1894 | Minier |
| 1,794,700 | A | 3/1931 | Mccaskey |
| 2,371,433 | A | 3/1945 | Davis |
| 3,010,535 | A | 11/1961 | Depiano |
| 3,477,679 | A | 11/1969 | Lovitz |
| 3,738,601 | A | 6/1973 | Gehringer |
| 3,768,592 | A | 10/1973 | Higgins |
| 3,829,051 | A | 8/1974 | Emmons |
| 3,915,189 | A | 10/1975 | Holbrook |
| 4,016,955 | A | 4/1977 | Gates |
| D248,777 | S | 8/1978 | Spencer |
| 4,176,580 | A | 12/1979 | Gallegos |
| 4,261,435 | A | 4/1981 | Winter |
| 4,318,454 | A | 3/1982 | Johnson |

(Continued)

FOREIGN PATENT DOCUMENTS

| | | |
|---|---|---|
| DE | 334240 | 3/1921 |

OTHER PUBLICATIONS

Little Giant Ladder Systems, "Little Giant Work Platform," Advertising Brochure, (May 23, 2005).

*Primary Examiner* — Daniel P Cahn
*Assistant Examiner* — John W Hanes, Jr.
(74) *Attorney, Agent, or Firm* — Fitch, Even, Tabin & Flannery LLP

(57) ABSTRACT

The present invention pertains to a ladder top for a stepladder. The top comprises a plane having a front and a rear. The plane has a bin with a curved front side adjacent the front of the plane for holding small electrical parts. The plane has at least one screwdriver hole for holding the screwdriver. The plane has a hammer/drill holster slot. The plane has a pliers slot. The plane has a wire strippers slot and a channel locks slots. A method for using a ladder top for a stepladder.

21 Claims, 2 Drawing Sheets

(56) References Cited

U.S. PATENT DOCUMENTS 4,653,713 A 3/1987 Hamilton
4,714,162 A 12/1987 Harrison
4,858,869 A 8/1989 Stang
4,862,994 A 9/1989 Hughes, Sr.
4,995,578 A 2/1991 Monheim
5,035,389 A 7/1991 Wang
5,052,581 A 10/1991 Christ
5,134,908 A 8/1992 Fisher
5,150,938 A 9/1992 Gans
5,158,023 A 10/1992 Allen
D334,240 S * 3/1993 Huffine .......................... D25/68
5,240,214 A 8/1993 Birnbaum
5,259,480 A 11/1993 Bartnicki
5,263,550 A 11/1993 Jines
5,351,730 A * 10/1994 Lewellen ................. B25H 1/06 144/286.5
5,358,070 A 10/1994 Bartnicki
5,370,263 A 12/1994 Brown
5,419,409 A 5/1995 Corulla
5,433,416 A 7/1995 Johnson
5,460,241 A 10/1995 Labelle
5,503,245 A 4/1996 Etesam
5,505,302 A 4/1996 Ferley
5,547,080 A 8/1996 Klimas
D374,937 S 10/1996 Salas
5,573,081 A 11/1996 Bartnicki
5,584,357 A 12/1996 Gugel
5,622,278 A 4/1997 Fries
5,628,381 A 5/1997 Markovich
5,673,885 A 10/1997 Pham
5,722,507 A 3/1998 Kain
5,740,883 A 4/1998 Trank
5,782,314 A 7/1998 Zeitler
5,873,433 A 2/1999 Katz
5,899,420 A 5/1999 Gerardi
5,913,380 A 6/1999 Gugel
5,924,615 A 7/1999 Mcgarrah
6,024,192 A 2/2000 Griffin
D422,717 S 4/2000 Bartnicki
6,089,383 A 7/2000 Heneveld
D447,818 S 9/2001 Weber
6,401,862 B1 6/2002 Caron
6,412,601 B1 7/2002 Schmidt
6,443,260 B1 9/2002 Katz
6,454,050 B2 9/2002 Gibson
6,467,577 B1 10/2002 Charlebois, Jr.
6,481,583 B1 11/2002 Black
6,502,664 B1 1/2003 Peaker, Sr.
6,591,941 B1 7/2003 Mannie
D500,145 S 12/2004 Cromberg
6,880,794 B1 4/2005 Kahn
6,938,766 B1 9/2005 Lee
6,997,282 B1 2/2006 Sharp
7,063,187 B1 * 6/2006 Lavigne .................... E06C 1/39 248/238
7,077,238 B2 7/2006 Butler
D529,871 S 10/2006 Butler
D530,025 S 10/2006 Patton
D531,322 S 10/2006 Patton
7,159,694 B2 1/2007 Gibson
7,188,706 B2 3/2007 Simpson
D541,433 S 4/2007 Wise
7,264,084 B1 9/2007 Switzer
7,270,307 B2 * 9/2007 Zodnik ..................... E06C 7/14 248/238
7,341,259 B1 3/2008 Slabich
7,706,878 B2 4/2010 Freeman
7,886,872 B2 2/2011 Astor
8,210,313 B2 7/2012 Astor
8,272,478 B2 9/2012 Astor
8,365,863 B2 2/2013 Astor
8,376,085 B2 2/2013 Astor
8,453,796 B2 6/2013 Astor
8,528,696 B2 9/2013 Astor
9,714,541 B2 7/2017 Astor
10,781,636 B2 9/2020 Astor
2002/0017430 A1 2/2002 Rosko
2002/0070137 A1 * 6/2002 Hedges ..................... E06C 7/14 206/373
2003/0213646 A1 11/2003 Gallion
2003/0230452 A1 12/2003 Campagna
2004/0149607 A1 8/2004 Gorman
2005/0056486 A1 3/2005 Butler
2005/0150724 A1 7/2005 Snider
2005/0247838 A1 11/2005 Zodnik
2005/0251213 A1 11/2005 Freeman
2005/0258002 A1 11/2005 Sabo
2005/0274575 A1 12/2005 Gibson
2005/0280228 A1 * 12/2005 Fernandes ................ B25H 1/00 280/47.35
2006/0070806 A1 * 4/2006 Simpson ................... E06C 7/14 182/129
2007/0084669 A1 4/2007 Campagna
2007/0181366 A1 8/2007 Astor
2007/0181367 A1 8/2007 Astor
2007/0181761 A1 8/2007 Astor
2007/0193829 A1 8/2007 Astor
2008/0142300 A1 6/2008 Roberge
2009/0078504 A1 3/2009 Astor
2009/0179125 A1 7/2009 Astor
2012/0261369 A1 10/2012 Astor
2012/0325583 A1 12/2012 Astor
2013/0146394 A1 6/2013 Astor
2014/0008499 A1 1/2014 Astor
2018/0023344 A1 1/2018 Astor

* cited by examiner

LADDER AND LADDER TOP WITH TOOL SLOT

CROSS-REFERENCE TO RELATED APPLICATIONS

This is a continuation of U.S. patent application Ser. No. 13/608,643 filed Sep. 10, 2012, now U.S. Pat. No. 10,781,636 issued Sep. 22, 2022 which is a continuation of U.S. patent application Ser. No. 12/322,647 filed Feb. 5, 2009, now U.S. Pat. No. 8,272,478 issued Sep. 25, 2012, which is a continuation of U.S. patent application Ser. No. 11/347,613 filed Feb. 3, 2006, now U.S. Pat. No. 8,376,085 issued Feb. 19, 2013, all of which are incorporated by reference herein.

FIELD OF THE INVENTION

The present invention is related to ladder tops. More specifically, the present invention is related to ladder tops for use by electricians.

BACKGROUND OF THE INVENTION

For years, stepladders have been designed for the general construction and painting professionals' needs. The new electrician's ladder is designed for the specific needs of the electrician. New features have been added to aid in the installation of conduit, running wires, and tool storage. Specifically, the top has been redesigned to greatly benefit the electrician while on the ladder.

SUMMARY OF THE INVENTION

The present invention pertains to a ladder top for a stepladder. The top comprises a plane and/or a rigid panel 30 having a front and a rear. The plane has a bin with a curved front side adjacent the front of the plane for holding small electrical parts. The plane has at least one screwdriver hole for holding the screwdriver. The plane has a hammer/drill holster slot. The plane has a pliers slot. The plane has a wire strippers slot and a channel locks slots. The plane has a groove along the length of the top for holding tubing, pipe and conduit.

The present invention pertains to a method for using a ladder top for a stepladder. The method comprises the steps of obtaining small electrical parts from a bin in a plane with a curved front side adjacent a front of the plane. There is the step of placing at least one screwdriver in a screwdriver hole in the plane for holding the screwdriver. There is the step of placing a hammer in a hammer/drill holster slot in the plane. There is the step of placing a pliers in a pliers slot in the plane. There is the step of placing a wire strippers in a wire strippers slot in the plane. There is the step of placing channel locks in channel locks slots in the plane. There is the step of placing a conduit in a groove along a length of the plane.

The present invention pertains to a ladder top for a stepladder. The top comprises a plane having a front and a rear, the plane having at least a first bungee tool holding slot to hold a ball and bungee strap unit.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
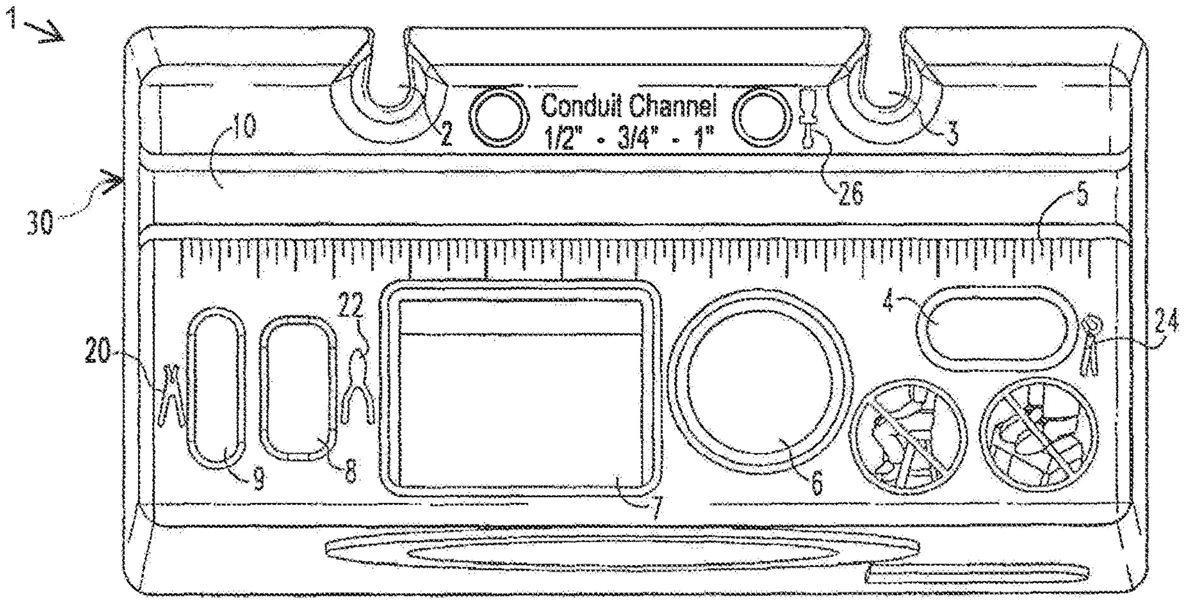
FIG. 1 is an overhead view of the ladder top of the present invention.
Figure 3:
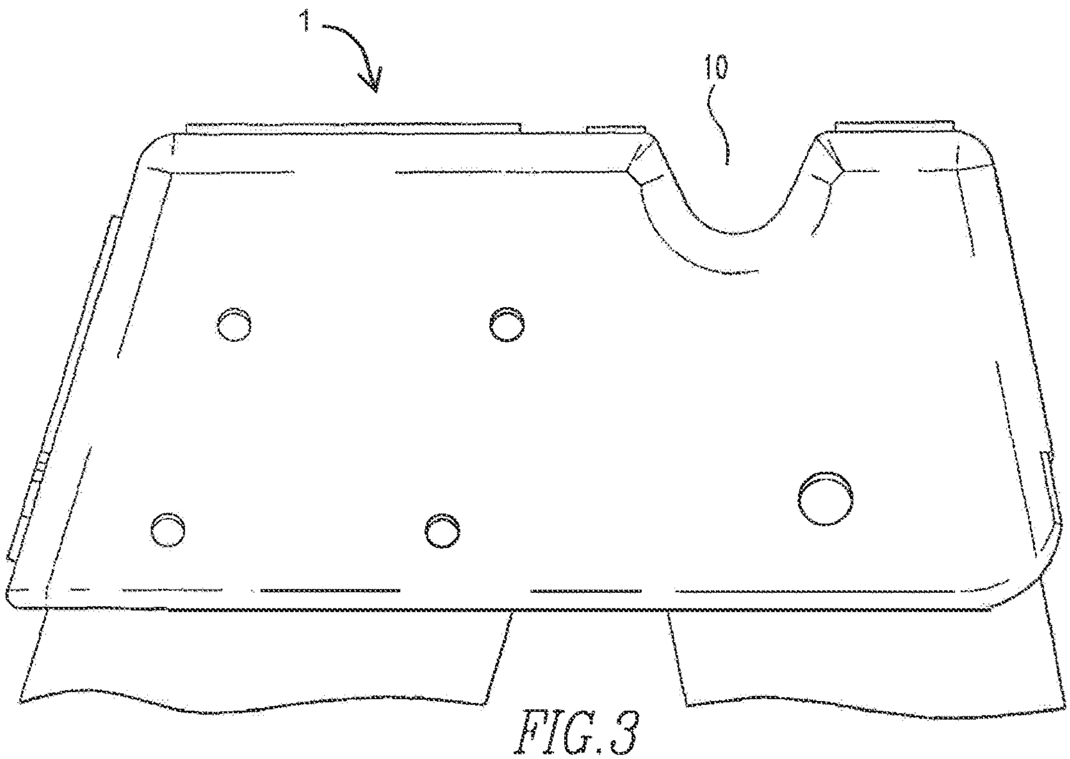
FIG. 3 is a side view of the ladder top of the present invention.
Figure 2:
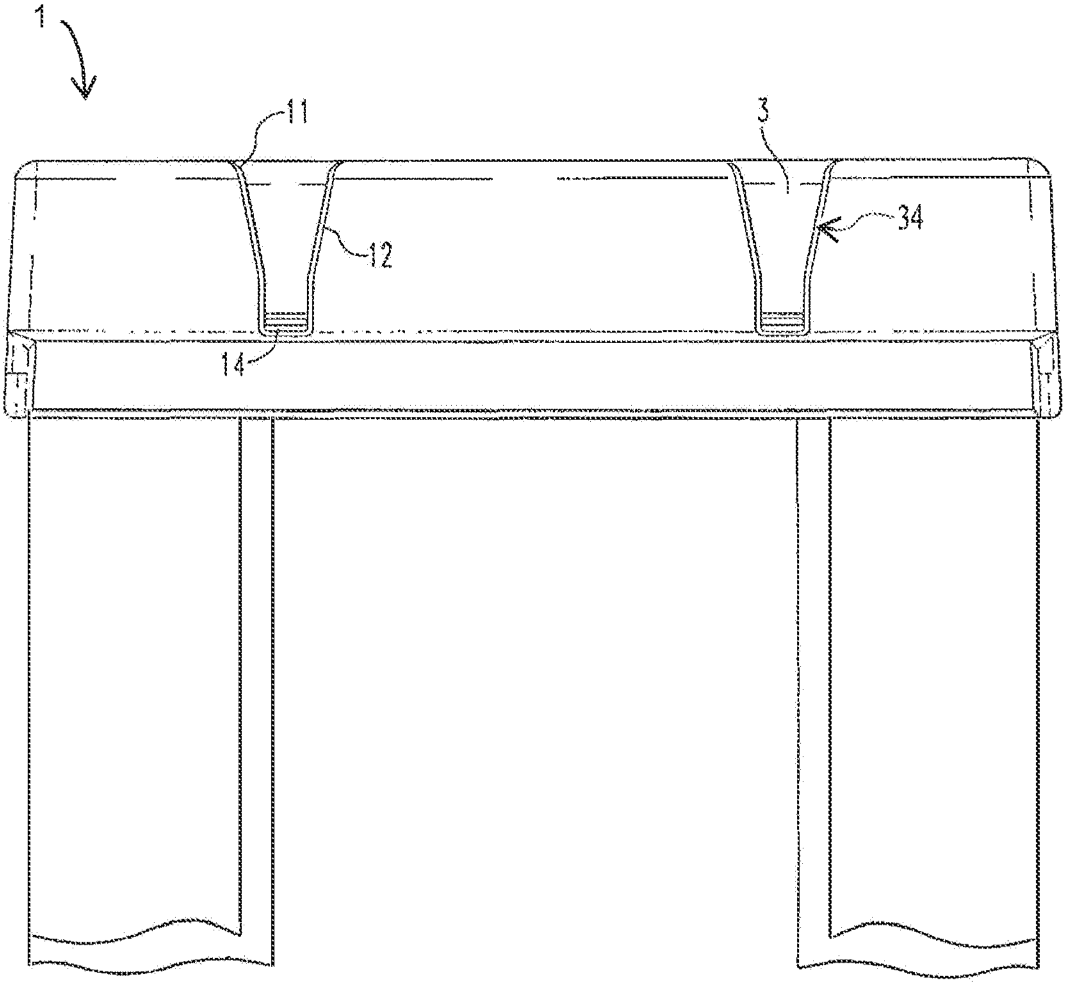
FIG. 2 is a rear view of the ladder top of the present invention.

Referring now to the drawings wherein like reference numerals refer to similar or identical parts throughout the several views, and more specifically to FIGS. 1-3 thereof, there is shown a ladder top 1 for a stepladder. The top 1 comprises a plane 24 having a front and a rear. The plane 24 has a bin with a curved front side adjacent the front of the plane 24 for holding small electrical parts. The plane 24 has at least one screwdriver hole 2 for holding the screwdriver. The plane 24 has a hammer/drill holster slot 6. The plane 24 has a pliers slot 8. The plane 24 has a wire strippers slot 9 and a channel locks slots 4. The plane has a groove along the length of the top for holding tubing, pipe and conduit. In some embodiments, the top 1 includes a rigid panel 30 with a front and the rear.

Preferably, the plane 24 has a bungee tool holding slot 3. The plane 24 preferably has a conduit holder 10 disposed adjacent the rear of the plane 24. Preferably, the plane 24 has graduated lines 5 and for measuring items. The top 1 preferably includes a screwdriver image 26 adjacent the screwdriver slot.

The top 1 preferably includes a channel locks image 24 adjacent the channel locks slot 4, a pliers image 22 adjacent the pliers slot 8 and a wire strippers image 20 adjacent the wire strippers slot 9. Preferably, the plane 24 has a left side and a right side. The graduated lines 5 are preferably ⅛ inch intervals apart. Preferably, the image is an icon part of the plane 24 or a label.

The present invention pertains to a method for using a ladder top 1 for a stepladder. The method comprises the steps of obtaining small electrical parts from a bin in a plane 24 with a curved front side adjacent a front of the plane 24. There is the step of placing at least one screwdriver in a screwdriver hole 2 in the plane 24 for holding the screwdriver. There is the step of placing a hammer in a hammer/drill holster slot 6 in the plane 24. There is the step of placing a pliers in a pliers slot 8 in the plane 24. There is the step of placing a wire strippers in a wire strippers slot 9 in the plane 24. There is the step of placing channel locks in channel locks slots 4 in the plane 24. There is the step of placing a conduit in a groove along a length of the plane.

The present invention pertains to a ladder top for a stepladder. The top comprises a plane having a front and a rear, the plane having at least a first bungee tool holding slot to hold a ball and bungee strap unit.

Preferably, the plane has a second bungee tool holding slot. The plane preferably has a top and a bottom, and each slot is wider at the top than the bottom. Preferably, the plane has sides which extend down from the top. Each bungee slot is preferably disposed at the rear of the plane in the rear side.

In the operation of the preferred embodiment, the thermo plastic top 1 is designed for a IA extra heavy duty, reinforced fiberglass stepladder. The ladder comes in a number of different sizes.

The top 1 has many new features designed especially for the electrician. The top 1 has two screwdriver holes 2 and one hammer/drill holster 6. The top 1 also features slots 4 for channel locks, side cutters and pliers 8, and wire strippers 9. Each of the said features has a raised icon next to it for easy identification.

New bungee tool holding system slots 3 are located off of the back surface of the top 1. These slots 3 hold bungee straps that can be connected to a variety of power and non power tools electricians use daily. Once the bungee is secured to the tool, the user can place the ball end of the system into the slot 3 for storing while he is working on the ladder. The slots 3 are also able to accept accessories that are designed to fit into the slot 3 that are designed for electricians.

The groove, preferably, conduit holder 10, is located near the rear of the top 1. This holder 10 is designed to hold ½, ¾, and 1 inch as well as a plurality of other sizes. The electrician can use this conduit holder 10 to hold conduit, pipe and tubes while working on the ladder. The slots 10 give the user an extra hand and help prevent the materials from rolling off of the top 1.

The small parts tray 7 is a deep bin used to hold a variety of small parts electricians use on a daily basis. The tray 7 is curved near the front make retrieving the smaller parts easier.

Graduated lines 5 are spaced at ⅛ inch intervals to help in the rough measuring of items while up on the ladder. The lines 5 can be used to determine the length of a wide variety of objects the electrician is handling while on the stepladder.

The bungee slots 3 on the top 1 are used to hold a ball and bungee strap unit that holds tools while they are not in use. The users are often high on the ladder and tools placed on the top that are not secured have the chance of falling and injuring persons below. The user will connect his tool to the bungee strap. When the tool is not in use the user can place the ball end of the bungee strap into the slot 3 on the top. This securely holds the tools until the user is ready for them.

The slots are wider at the top 11 and then have a sloped face 12 to the ledge 14 that holds the bungee strap. As shown in FIG. 2, the slots 3 may include a sidewall 34 which extends from the top surface. The slots are optimally placed at the rear of the top so tools can hang off of the back of the ladder and not injure the climber or cause an imbalance of the ladder; although the placement of the slot is up to the designer.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A ladder comprising:

a first rail and a second rail; and a ladder top cap including a front surface, a rear surface, and side walls therebetween, the ladder top cap directly coupled to an uppermost end of the first rail and the second rail via openings in the side walls, the ladder top cap including at least a first slot and a second slot disposed along only the rear surface and spaced apart from one another by a portion of the rear surface, the first slot and the second slot each capable of coupling a retaining portion of an accessory to the ladder top cap via slidable engagement between the retaining portion of the accessory and one of the first slot and the second slot, wherein the ladder top cap includes a top surface and a bottom surface, the first slot including a first sidewall and the second slot including a second sidewall, wherein the first and second sidewalls extend along the rear surface from the top surface to the bottom surface to form respective first and second recesses extending inward from the rear surface to receive the retaining portion of the accessory therein, the first sidewall of the first slot and the second sidewall of the second slot each including a sloped surface that slopes inward as the sloped surface extends toward the bottom surface of the ladder top such that the first slot and the second slot are wider at the top surface of the ladder top cap than the bottom surface of the ladder top cap, and wherein the first slot includes a first ledge that extends inward from the first sidewall about a bottom of the first slot and the second slot includes a second ledge that extends inward from the second sidewall about a bottom of the second slot.

2. The ladder of claim 1 wherein the first ledge of the first slot is vertically aligned with the second ledge of the second slot.

3. The ladder of claim 1 wherein the first sidewall of the first slot and the second sidewall of the second slot each have a first end connected to the rear surface and a second end connected to the rear surface, the first end and the second end of the first sidewall spaced apart by a first gap, the first end and second end of the second sidewall spaced apart by a second gap.

4. The ladder of claim 1 wherein the ladder top cap includes a first tool opening configured for retaining a screwdriver.

5. The ladder of claim 4 wherein the ladder top cap further includes a second tool opening configured for retaining a drill.

6. The ladder of claim 1 wherein the ladder top cap includes a groove extending along a length of the top surface and in a right side and a left side configured to hold tubing, pipe or conduit.

7. The ladder of claim 1 including at least one of: a channel locks slot, a pliers slot or a wire strippers slot.

8. The ladder of claim 1 wherein the ladder top cap includes graduated lines for measuring items.

9. A ladder top cap comprising:

a body including a front wall having a front surface, a rear wall having a rear surface, a first side, and a second side, the first side and the second side connecting the front wall and the rear wall, the body further including a bottom surface and a top surface connected to the front wall, rear wall, first side, and second side; and at least one slot disposed down and along only the rear surface of the body, the at least one slot including a sidewall extending along the rear surface from the top surface to the bottom surface to form a recess extending inward from the rear surface to receive a retaining portion of an accessory therein, the sidewall of the at least one slot including a sloped portion such that the at least one slot is widest adjacent the top surface of the ladder top cap and slopes inward as the at least one slot extends toward the bottom surface, wherein the at least one slot includes a ledge at a bottom of the rear surface that extends inward from the sidewall about a bottom of the at least one slot and which is integral with the ladder top cap, wherein the at least one slot is configured to slidably engage at least the retaining portion of the accessory, wherein the ladder top cap is directly couplable to a first and a second rail, the first side of the body including at least one first opening to directly couple the ladder top to an uppermost end of a first rail, the second side of the body including at least one second opening to directly couple the ladder top cap to an uppermost end of a second rail.

10. The ladder top cap of claim 9 further comprising a recess, a tool holster opening, an inset bin for tool retention, and a second slot.

11. The ladder top cap of claim 10 further comprising a groove extending along a length of the top surface for retaining accessories.

12. An apparatus comprising:

a ladder top cap with an upper surface, a bottom surface, a front surface, a rear surface, and two sides connecting the front surface and the rear surface;

a first slot extending from the upper surface of the ladder top cap to the bottom surface and along only one of the front surface or the rear surface of the ladder top cap and inset from the two sides, wherein the first slot includes a first sidewall extending from the upper surface to the bottom surface and forming a first recess extending inward of the one of the front surface or the rear surface, the first sidewall forming a first upper opening and a first lower opening, the first upper opening being adjacent the upper surface and larger than the first lower opening adjacent the bottom surface, wherein the first slot is configured to retain one or more slidably engageable accessories, wherein the first slot includes a first ledge at the bottom surface of the ladder top cap, wherein the first ledge is integral with the ladder top cap and extends inward from the first sidewall about a bottom of the first slot;

a second slot extending from the upper surface of the ladder top cap to the bottom surface and along only one of the front surface or the rear surface of the ladder top cap and inset from the two sides, wherein the second slot includes a second sidewall extending from the upper surface to the bottom surface and forming a second recess extending inward of the one of the front surface or the rear surface, the second sidewall forming a second upper opening and a second lower opening, the second upper opening being adjacent the upper surface and larger than the second lower opening adjacent the bottom surface, wherein the second slot is configured to retain one or more slidably engageable accessories, wherein the second slot includes a second ledge at the bottom surface of the ladder top cap, wherein the second ledge is integral with the ladder top cap and extends inward from the second sidewall about a bottom of the second slot; and a pair of rails and rungs forming a stepladder, with the ladder top cap disposed atop the rails, the ladder top cap being directly coupled to uppermost ends of the pair of rails via openings in the sides of the ladder top cap.

13. The apparatus of claim 12 further comprising an inset bin in the upper surface of the ladder top cap, and a plurality of tool openings.

14. The apparatus of claim 12 wherein the first ledge of the first slot is vertically aligned with the second ledge of the second slot.

15. The apparatus of claim 12 wherein the first slot is spaced apart from the second slot by a portion of the rear surface.

16. A ladder top cap comprising:

a body including a front surface, a rear surface, a first side, and a second side, wherein the first side and the second side connect the front surface and the rear surface; and a first slot and a second slot disposed along only the rear surface of the body, the first slot including a first recess and the second slot including a second recess extending inward from the rear surface, the first slot spaced from the second slot by a portion of the rear surface of the body, the first slot and the second slot each including an upper end adjacent a top surface and a lower end adjacent a bottom of the rear surface, wherein the first slot and the second slot are configured to slidably engage accessories, wherein the first slot includes a first ledge extending into the first recess about a bottom thereof and the second slot includes a second ledge extending into the second recess about a bottom thereof, wherein the ladder top cap is configured to attach to a top of a ladder including a first rail and a second rail, the first side and second side of the ladder top cap including openings to directly attach the ladder top cap to uppermost ends of the first rail and second rail.

17. The ladder top cap of claim 16 further comprising a tool opening and an inset bin for tool retention.

18. The ladder top cap of claim 16 further comprising a groove extending along a length of the top surface for retaining accessories.

19. The apparatus of claim 12, wherein the first slot and the second slot are disposed at the rear surface of the ladder top cap.

20. The ladder top cap of claim 16 wherein the first slot includes a first sidewall and the second slot includes a second sidewall, where the first and the second sidewalls each have a first end connected to the rear surface and a second end connected to the rear surface, the first end and the second end of the first sidewall spaced apart by a first gap, the first end and the second end of the second sidewall spaced apart by a second gap.

21. The ladder of claim 1 wherein the first ledge of the first slot and the second ledge of the second slot extend horizontally into the respective first slot and the second slot.

* * * * *